United States Patent [19]

Radford et al.

[11] 4,430,276

[45] Feb. 7, 1984

[54] METHOD OF MAKING STABLE UO$_2$ FUEL PELLETS

[75] Inventors: Kenneth C. Radford, Churchill Borough; James M. Pope, Monroeville, both of Pa.

[73] Assignee: Westinghouse Electric Corp., Pittsburgh, Pa.

[21] Appl. No.: 308,316

[22] Filed: Oct. 2, 1981

[51] Int. Cl.$^3$ .............................................. G21C 21/00
[52] U.S. Cl. ..................... 264/0.5; 252/640; 376/418; 423/261
[58] Field of Search ......................... 264/0.5; 376/418; 423/258, 261; 252/640

[56] References Cited

U.S. PATENT DOCUMENTS

| | | | |
|---|---|---|---|
| 3,715,273 | 2/1973 | Rigby et al. | 376/418 |
| 3,923,933 | 12/1975 | Lay | 264/0.5 |
| 4,117,083 | 9/1978 | Maas, Jr. | 423/258 |
| 4,119,559 | 10/1978 | Maas, Jr. | 423/258 |

FOREIGN PATENT DOCUMENTS

| | | | |
|---|---|---|---|
| 39-12207 | 1/1964 | Japan | 264/0.5 |
| 1155969 | 6/1969 | United Kingdom | 264/0.5 |

OTHER PUBLICATIONS

Raven, "Gas Retentive Annular Fuel Pellets Palliative or Panacea for L.R.W?", presented to the American Ceramic Society, Cincinnati, Ohio, May 1979, 19 pages.

*Primary Examiner*—Leland A. Sebastian
*Attorney, Agent, or Firm*—R. D. Fuerle

[57] ABSTRACT

A method is disclosed for producing a dimensionally stable UO$_2$ fuel pellet of large grain mole %, and relatively large pore size. A dopant containing an element selected from the group consisting of aluminum, calcium, magnesium, titanium, zirconium, vanadium, niobium, and mixtures thereof is added to a highly sinterable UO$_2$ powder, which is a UO$_2$ powder that is sinterable to at least 97% theoretical density at 1600° C. in one hour, and the UO$_2$ powder can then be formed into fuel pellets. Alternatively, the dopant can be added at a step in the process of producing ammonium diuranate. The ammonium diuranate is collected with about 0.05 to about 1.7 mole%, based on UO$_2$, of a compound containing said element. That mixture is then calcined to produce UO$_2$ and the UO$_2$ is formed into a fuel pellet. The addition of the dopant can also be made at the hydrolysis stage in the manufacture of UO$_2$ by a dry conversion process.

13 Claims, No Drawings

METHOD OF MAKING STABLE UO₂ FUEL PELLETS

BACKGROUND OF THE INVENTION

In the manufacture of $UO_2$ pellets for use in nuclear reactors, high density pellets are desirable to maximize the amount of fuel per unit volume, but due to the formation of fission products in the fuel some porosity is also desirable in order to contain these fission products. A compromise of these opposing considerations requires that the $UO_2$ fuel pellets have an optimum density of about 95%.

The $UO_2$ fuel pellets are prepared by sintering pressed $UO_2$ powder. If the $UO_2$ powder is of poor quality, the pellets will sinter to less than the optimum density. In order to achieve higher densities, various dopants may be added to the $UO_2$ powder prior to sintering. While the addition of the dopants may enable the powder to sinter to the optimum density, they are not normally added during commercial fuel fabrication. Without the addition of sintering aids, a fuel pellet made from poorly sinterable powder results in grains of small size. A small grain size generally is equivalent to a fine porosity which readily disappears in use in the reactor, permitting the escape of fission gases during operation. Second, while the pellets have the optimum density initially, they are often not stable in the reactor and gradually become denser when subjected to the heat of the reactor. In pressurized reactors where the fuel rods themselves are not pressurized, this can result in the collapse of the fuel rod, while gaps can be formed as a result of pellet densification in all fuel rods.

A different sort of problem arises when highly sinterable $UO_2$ powders are used to prepare the fuel pellets. These powders, which result if the particle size of the $UO_2$ is very fine, sinter to a density which is above the optimum density. If the sintering process is stopped when the optimum density is reached, the fuel pellets will simply continue to densify in the reactor. Thus, until now, highly sinterable $UO_2$ powders could not be used without otherwise reducing the sinterability by introduction of large quantities of scrap or oxidized material ("add-back") to reduce the density which also results in an increase in the quantity of fine porosity.

SUMMARY OF THE INVENTION

We have discovered that certain dopants can be added during one of the steps in the process of producing ammonium diuranate (ADU), from which $UO_2$ powder is produced, so as to yield a $UO_2$ fuel pellet of the optimum density. Pellets produced according to the process of this invention are dimensionally stable in a reactor and have the desirable large grain size.

We have also discovered, quite surprisingly, that the addition of these dopants to a highly sinterable $UO_2$ powder will actually lower the density to which the powder will sinter, yet still produce a dimensionally stable fuel pellet of large grain size. Because the fuel pellets produced according to the method of this invention are dimensionally stable in a reactor, they do not densify and cause the collapse of the fuel rods. In addition, because they have a large grain size, the fission products remain trapped in the fuel pellets and do not escape into the reactor. Also, because the sinterability of the powder is modified by the sintering aid, the fraction of fine pores <2 μm is reduced considerably giving a larger mean pore size.

PRIOR ART

A paper presented to the American Ceramic Society in Cincinnati, Ohio in May, 1979, by L. F. A. Raven entitled "Gas Retentive Annular Fuel Pellets: Palliative or Panacea for the L.W.R.?" discloses the addition of $TiO_2$, $MgO$, $Al_2O_3$, $CrO_2$, and $Nb_2O_5$ to $UO_2$ to increase the grain size of sintered $UO_2$ while simultaneously increasing the density.

DESCRIPTION OF THE INVENTION

In the process of this invention, a dopant is added at some step during the formation of ammonium diuranate (ADU), or the resulting $UO_2$, so that the fuel $UO_2$ contains about 0.05 to about 1.7 mole% (based on $UO_2$) of the dopant. The dopants of this invention are compounds of aluminum, calcium, magnesium, titanium, zirconium, vanadium, niobium, or mixtures thereof. The preferred dopant element is either titanium, niobium, or a mixture of about 40 to about 60 mole% calcium with about 40 to about 60 mole% titanium. The compound may be an oxide, a nitrate, an oxalate, a uranate, a chloride, a fluoride, or other suitable compound. If the dopant is added at a step in the process of producing ADU where the uranium is in solution, the dopant should be soluble. If the dopant is added at a later stage to the solid (slurry) ADU or to the $UO_2$, an insoluble dopant may be used. The preferred compound is a nitrate because uranyl nitrate, $UO_2(NO_3)_2$, is commonly used in the preparation of ADU and a nitrate dopant would be compatible with that process. Fluoride compounds are also desirable dopants because they have particular compatibility with uranyl fluoride, $UO_2F_2$, which is another common precursor of ADU. Thus, it is preferable to add the dopant as a soluble compound to a solution containing the uranium as this results in a more homogeneous mixture of the uranium and the dopant, avoids a solids mixing step, and requires less dopant.

The ammonium diuranate from which the $UO_2$ is prepared can be produced by reacting gaseous $UF_6$ with water to produce a solution of uranyl fluoride according to the equation:

$$UF_6 + 2H_2O \rightarrow UO_2F_2 + 4HF$$

The ADU can be precipitated from the uranyl fluoride solution by the addition of an ammonium compound such as ammonium hydroxide.

$$2UO_2F_2 + 2NH_4OH + H_2O \rightarrow (NH_4)_2U_2O_7 + 4HF$$

Alternatively, liquid uranyl nitrate, obtained typically from reprocessing scrap sintered pellets by dissolution with nitric acid, could be reacted with ammonium hydroxide to yield ADU as given by:

$$UO_2(NO_3)_2 + 6NH_4OH \rightarrow (NH_4)_2U_2O_7 + 4NH_4NO_3 + 3H_2O$$

The dopant could be added either as a soluble compound to the water into which the $UF_6$ is introduced or into the solution of uranyl fluoride or uranyl nitrate, or to the slurry of the precipitated ADU where an insoluble compound, such as an oxide, could also be used. It is preferable to add the dopant to the uranyl nitrate or fluoride solution in the precipitation vessel as this is the most convenient point of addition.

The UO$_2$ can be prepared from the ADU by calcining at about 500° to 750° C. or other suitable temperature for a time typically of about 1 to 3 hours in a steam/hydrogen atmosphere having a wide range of possible ratios.

The production of ADU as an intermediate can be avoided and the UO$_2$ can be produced more directly by reacting UF$_6$ with steam to produce a dry uranyl fluoride. The addition of hydrogen to the uranyl fluoride produces the UO$_3$.

$$U_2F_2 + H_2 + UO_2 + 2HF$$

If this process of producing UO$_2$ is used, it should be possible to add the dopant to either the steam as an aerosol or to mix the dopant with the resulting UO$_2$ powder where an insoluble compound could also be used.

The preparation of fuel pellets from the powdered UO$_2$ is a process well known in the art. A common procedure is to grind the UO$_2$ powder to a particle size of less than 30 microns. The powder is then prepressed ("slugged") and crushed into a form suitable for feed for an automatic press. The resultant material is mixed with a die lubricant, and is pressed to about 40 to about 65% of TD (theoretical density, about 10.96 grams per cc). The pressed powder can then be sintered at about 1400° to 1800° C. for about 1 to about 10 hours, but usually about 5 hours, to produce the fuel pellets.

The dopants used in the process of this invention will reduce the density, increase the grain size and mean pore size, and stabilize fuel pellets fabricated from a highly sinterable UO$_2$ powder. A highly sinterable UO$_2$ powder may be defined as a powder which will sinter (without the addition of a dopant) to greater than 97% of theoretical density within one hour in H$_2$ at 1600° C. Highly sinterable powders are physically different from less sinterable powders in that they have a smaller particle size and behave differently under electrophoretic conditions having as they have more positive zeta potentials than powders of poorer sinterability.

The following examples further illustrate this invention.

EXAMPLE I

This example describes the addition of dopant oxides or salts to highly sinterable UO$_2$ (whose characteristics were defined previously). In the case of the dopant being introduced as a salt, the addition was made by mortar and pestle mixing of the salts with the UO$_2$ powder for 30 minutes in aqueous media. These slurries were then dried in a vacuum oven at 60° C., with the resultant cake being granulated and "slugged" and pressed into pellets as given below. Salts, e.g., nitrates, of Ti, V, Al, Ca, Mg, Nb, and mixtures of Ca and Ti, in the range of 0.05 to 0.15 mole% cation produced the proper density, thermal stability, and tailored microstructure.

In the case of the oxide dopants, these were added to the UO$_2$ powder by roll blending for 15 minutes before slugging to 4.5 g/cm$^3$. The slugs were granulated through a 14 mesh screen and roll blended with 0.2 wt.% zinc stearate (die lubricant) for 10 minutes prior to pressing pellets to a green density of 5.8 g/cm$^3$. Oxide additions including Ti, V, Al, Ca, Mg, Nb, and mixtures of Ca plus Ti, in the approximate ranges 0.05 to 1.7 mole% with respect to the UO$_2$, were found to produce the aforementioned special pellet features upon sintering.

The pellets were sintered at 1780° C. for 1 hour in H$_2$ saturated with room temperature water vapor. The density, thermal stability (or change in density on resintering for extended times up to 33 hours at 1780° C.), associated grain size, and quantitative porosity were measured. *Undoped* UO$_2$ pellets had an as-sintered density of 97.8% of theoretical, a grain size of 7.9 μm and contained fine porosity, primarily <1 μm, and little or none >5 μm. On resintering, the density increased to greater than 99% of theoretical.

In contrast, the *doped* UO$_2$ pellets had a controlled density of ~95% of theoretical, which satisfies current LWR fuel specifications. Importantly, these pellets were stable on resintering, showing less than a 1% increase in density. This stability, crucial for good in-reactor fuel performance, is attributable to the relatively large grain size (~15–30 μm) and large porosity (generally, >5 μm size) produced in the doped pellets. Furthermore, these microstructural features are known to be valuable for good fission gas retention during reactor operation.

If an excessive amount of dopant is added, evidence of a second phase begins to be apparent primarily as a grain boundary phase. This situation is to be avoided since enhanced grain boundary mobility due to a liquid phase would result in excessive deformation during reactor operation due to creep.

EXAMPLE II

This example describes the addition of the soluble dopant compound as an aqueous solution dissolved in the liquid uranyl fluoride. An intimate co-mix of ADU incorporating the dopant is then precipitated. Titanium nitrate in an amount corresponding to 0.15 mole% with respect to the uranyl fluoride was added to the uranyl fluoride while stirring. The concentration of uranium in the starting uranyl fluoride solution was 159 g/l, and it contained 2 moles of HF and 2 moles of NH$_4$F for each mole of UO$_2$F$_2$. A dispersant, Tamol 731, manufactured by Rohm and Haas, was also added at a concentration of 0.24 g/l to minimize agglomeration during precipitation. Subsequent co-precipitation from this solution of the ADU containing the dopant was effected by adding an excess of ammonium hydroxide. The conditions of precipitation included a pH of 10.2 obtained with a NH$_3$/U molar ratio of 26/1, a temperature of ~29° C., and a residence time of about 8 minutes. The co-precipitate was filtered from the reaction mixture and rinsed with deionized water.

The washed filter cake was calcined at 550° C. for 3 hours in a steam/hydrogen mixture of 50:1 ratio. The resulting UO$_2$ powder containing the dopant was fabricated into pellets as described previously.

Sintering was performed at 1780° C. for 8 hours in H$_2$ saturated with water vapor. Undoped (control) pellets had an average sintered density of approximately 97% of theoretical and a grain size of about 15–20 μm. Most of the porosity appeared to be less than 1 μm in size and practically none was greater than 5 μm. The pellets containing the additive(s) were notably superior. A controlled density of nearly 94% of theoretical, which meets the density criterium in light water reactors, was measured. Furthermore, the grain size was considerably larger, falling in the range 30 to 40 μm, and the porosity appeared to be relatively large and primarily greater than 5 μm in size. Limited resintering studies suggested that these microstructural characteristics would lead to excellent thermal stability in the pellets as would be expected and was the case in Example I.

EXAMPLE III

Example II was repeated using vanadium fluoride at a 0.05 mole% concentration instead of titanium nitrate.

EXAMPLE IV

Example II was repeated using 0.15 mole% niobium chloride instead of titanium nitrate.

EXAMPLE V

Example II was repeated using 0.15 mole% aluminum nitrate instead of titanium nitrate.

EXAMPLE VI

Examples, II, III, IV and V were repeated using uranyl nitrate instead of uranyl fluoride. In this case the same amount of the dopant cited in Examples II, III, IV and V was added. The uranium concentration in the uranyl nitrate starting solution was 160 g/l and it had a specific gravity of 1.298. Precipitation was performed at about 34° C. and using a $NH_3/U$ molar ratio of 28 to give a pH of ~9.5. The residence time for the co-precipitate was approximately 4 minutes.

EXAMPLE VII

Examples I and II were repeated using less or greater concentrations of dopants. In the case of too little dopant the LWR density specification range (93.5 to 96% of theoretical was not achieved), but rather an excessive density was reached. Furthermore, the pellets were not thermally stable due to their relatively small grain size (~10-15 μm) and their fine porosity (~1 μm) which persisted as in the undoped fuel.

When excess dopant was used, the density suppression generally was excessive to the extent that the pellets did not meet the minimum LWR requirement. Moreover, the grain size can be non-uniform or can exhibit discontinuous growth during sintering.

EXAMPLE VIII

This example describes the addition of dopant(s) as insoluble compounds to the wet ADU filter cake obtained from either the uranyl fluoride or the uranyl nitrate as recounted above. In one case niobium oxide in an amount equal to 0.20 mole% relative to the ADU was uniformly distributed in the ADU filter cake in a blending operation. The dopant-ADU mixture was then calclined as before to leave the dopant in intimate and uniform contact with the resultant $UO_2$. Pelleting and sintering followed with the same results as described in Example II.

EXAMPLE IX

Example VIII was repeated using 0.05 to 1.50 mole% titanium oxide (relative to the ADU) instead of the niobium oxide.

EXAMPLE X

Example IX was repeated using calcium oxide instead of titanium oxide in the same amount.

EXAMPLE XI

Example VIII was repeated using a mixture of calcium and titanium oxide in equal proportions and totaling from 1.0 to 2.0 mole% instead of the niobium oxide.

EXAMPLE XII

Example XI was repeated using calcium nitrate instead of calcium oxide.

EXAMPLE XIII

In the event these dopant levels are not reached or are exceeded, then the undesirable pellet properties described in Examples I and VII will be obtained causing the $UO_2$ fuel to be unacceptable.

We claim:

1. In a method where a $UO_2$ powder which is sinterable to at least 97% theoretical density at 1600° C. in $H_2$ in one hour is produced from an aqueous solution of $UO_2F_2$, an improvement which enhances the dimensional stability of a fuel pellet made from $UO_2$ powder, comprising adding a water soluble dopant forming compound containing an element selected from the group consisting of aluminum, calcium, magnesium, titanium, zirconium, vanadium, niobium, and mixtures thereof, to said solution in an amount such that said $UO_2$ powder contains about 0.05 to about 1.7 mole% of said dopant.

2. A method according to claim 1 wherein said ammonium diuranate and said dopant forming compound are precipitated by the addition of ammonium hydroxide to said solution of $UO_2 F_2$.

3. A method according to claim 2 wherein said dopant is a nitrate.

4. A method according to claim 1 wherein said element is selected from the group consisting of titanium, niobium, and a mixture of calcium and titanium.

5. A method according to claim 1 wherein said $UO_2$ is formed into a fuel pellet by grinding, pressing to about 40 to about 65% theoretical density, and sintering at about 1400° to about 1800° C. for about 1 to about 10 hours.

6. In a method where a $UO_2$ powder which is sinterable to at least 97% theoretical density at 1600° C. in $H_2$ in one hour is produced from water into which is added $UF_6$ gas, an improvement which enhances the dimensional stability of a fuel pellet made from said $UO_2$ powder, comprising adding a water soluble dopant forming compound containing an element selected from the group consisting of aluminum, calcium, magnesium, titanium, zirconium, vanadium, niobium, and mixtures thereof, to said water in an amount such that said $UO_2$ powder contains about 0.05 to about 1.7 mole% of said dopant.

7. A method according to claim 6 wherein said dopant is a nitrate.

8. A method according to claim 6 wherein said element is selected from the group consisting of titanium, niobium, and a mixture of calcium and titanium.

9. A method according to claim 6 wherein said $UO_2$ is formed into a fuel pellet by grinding, pressing to about 40 to about 65% theoretical density and sintering at about 1400° to about 1800° C. for about 1 to about 10 hours.

10. In a method where a $UO_2$ powder which is sinterable to at least 97% theoretical density at 1600° C. in $H_2$ in one hour is produced from an aqueous solution of uranyl nitrate, an improvement which enhances the dimensional stability of a fuel pellet made from said $UO_2$ powder, comprising adding a water soluble dopant forming compound containing an element selected from the group consisting of aluminum, calcium, magnesium, titanium, zirconium, vanadium, niobium, and mixtures thereof, to said solution in an amount such that said $UO_2$ powder contains about 0.05 to about 1.7 mole% of said dopant.

11. A method according to claim 10 wherein said dopant is a nitrate.

12. A method according to claim 10 wherein said element is selected from the group consisting of titanium, niobium, and a mixture of calcium and titanium.

13. A method according to claim 10 wherein said $UO_2$ is formed into a fuel pellet by grinding, pressing to about 40 to about 65% theoretical density and sintering at about 1400° to about 1800° C. for about 1 to about 10 hours.

* * * * *